United States Patent [19]

Jolly

[11] 4,107,334

[45] Aug. 15, 1978

[54] MODIFIED PROTEIN

[75] Inventor: Ramesh C. Jolly, Waterford, Conn.

[73] Assignee: Pfizer Inc., New York, N.Y.

[21] Appl. No.: 732,018

[22] Filed: Oct. 13, 1976

[51] Int. Cl.$^2$ .............................................. A23J 3/00
[52] U.S. Cl. ......................................... 426/7; 426/41; 426/52; 426/60; 426/72; 426/74; 426/583; 426/588; 426/656; 426/657
[58] Field of Search .................. 426/7, 41, 42, 44, 46, 426/49, 52, 60, 63, 72, 74, 583, 588, 656, 657; 195/28 R, 29; 260/112 R

[56] References Cited

U.S. PATENT DOCUMENTS

| | | | |
|---|---|---|---|
| 2,457,642 | 12/1948 | Butterfield et al. | 195/29 |
| 2,585,225 | 2/1952 | Carlson | 426/42 |
| 2,802,738 | 8/1957 | Anson et al. | 426/46 |
| 3,725,075 | 4/1973 | Muroi et al. | 195/28 R |
| 3,761,353 | 9/1973 | Hoe et al. | 195/29 |
| 3,830,942 | 8/1974 | Hawley | 426/46 |
| 3,843,802 | 10/1974 | Puski | 426/46 |
| 3,852,480 | 12/1974 | Williams | 426/46 |
| 3,857,966 | 12/1974 | Feldman et al. | 426/41 X |
| 3,970,520 | 7/1976 | Feldman et al. | 426/42 X |

*Primary Examiner*—Robert A. Yoncoskie
*Attorney, Agent, or Firm*—Connolly and Hutz

[57] ABSTRACT

Functional protein is prepared by heat denaturing impure natural protein selected from whey, microbial and vegetable protein and subjecting the separated denatured protein to enzymatic proteolysis for a period of up to 30 minutes at 20 to 65° C using at least a designated minimum amount of enzyme. Because of its high degree of functionality and its lack of bitter taste, the modified protein has a wide application in food compositions, primarily as a replacement for nonfat dry milk, sodium caseinate, gelatin and egg albumin.

11 Claims, No Drawings

MODIFIED PROTEIN

BACKGROUND OF THE INVENTION

This invention relates to proteins. More specifically, it relates to the modification of natural proteins to improve their functionality and thereby enhance their utility in food compositions.

Nutritional value is a primary concern in the world's quest for new sources of protein, but consideration must also be given to the protein's functional and flavor characteristics. For while nutritionally balanced foods may be prepared from a wide variety of sources, acceptability of such foods depends upon their sensory properties such as taste and texture. A protein substituted for traditional proteins should therefore maintain or improve the quality and acceptability of the food products in which it is incorporated. This requires that the new protein not only possess satisfactory nutritional properties, but also acceptable flavor, color and additional functional properties, such as solubility, thermal stability, emulsifying, foaming and texturizing characteristics.

At the same time, the food industry is seeking less expensive proteins for use in the preparation of modern convenience foods. In such uses, the protein often must have specific functional characteristics. For example, the protein in a coffee whitener should not precipitate when added to the coffee and a protein for use in carbonated beverages must be acid soluble.

It is therefore a primary objective of the present invention to provide a simple and inexpensive method of preparing functional protein for use in a wide variety of food compositions.

Prior attempts aimed at achieving such an objective include:

1. Direct enzymatic proteolysis of natural proteins such as taught in U.S. Pat. Nos. 2,489,208 and 3,889,001. This approach normally uses low levels of enzyme for extended reaction times. Yield of soluble functional protein from such processes is usually low and the product generally has poor flavor.

2. Enzymatic treatment of natural protein which has initially been subjected to high shear to modify the protein structure. As exemplified in U.S. Pat. No. 3,694,221, proteolysis of the pretreated protein is accomplished with high levels of enzyme for short reaction times and purportedly gives an easily wettable and dispersable product with good mouthfeel.

3. Enzymatic treatment of heat-treated protein such as disclosed in U.S. Pat. Nos. 3,857,966 and 3,876,806. In U.S. Pat. No. 3,857,966, heat-precipitated and separated protein is initially subjected to alkaline hydrolysis at elevated temperature and then to a sequential proteolytic hydrolysis which utilizes both microbial alkaline and neutral protease plus plant protease over a period of about two hours. U.S. Pat. No. 3,876,806 discloses a process in which an aqueous slurry of defatted vegetable seed protein is initially heat treated to destroy vegetative cells and then subjected to enzymatic proteolysis to produce soluble protein. Separation of water insolubles is made after rather than prior to the proteolysis, and the product therefore contains not only soluble protein but also water-soluble impurities present in the protein source material.

SUMMARY OF THE INVENTION

It has now been found that enzymatic proteolysis can be used in a simple manner to convert insoluble heat-denatured protein to a highly functional and bland product provided the enzyme level used is sufficient to develop the desired functionality in about 30 minutes or less. Accordingly, the present invention entails a process for the preparation of functional protein, which comprises:

(a) subjecting impure natural protein selected from the group consisting of whey, microbial protein and vegetable protein to a temperature of from about 40 to 150° C in aqueous medium until substantial protein precipitation occurs;

(b) separating said precipitated protein from said medium;

(c) treating said separated protein in aqueous medium with a proteolytic enzyme at a temperature of from about 20° to 65° C for a period of up to 30 minutes until solution occurs; and (d) deactivating said enzyme, said enzyme being employed at a level, per gram of said separated protein on a dry basis, of at least about 240 Hemoglobin Units on the Tyrosine basis (HUT) where said enzyme is a microbial acid protease, 300 bacterial protease units (PC) where said enzyme is a microbial neutral protease, 2300 Delf Units where said enzyme is a microbial alkaline protease, 130,000 N.F. papain units (N.F. PU) where said enzyme is a plant protease, and 150 Pepsin Units where said enzyme is an animal protease.

In preferred aspects of the invention, the functional protein is derived from whey or from a yeast selected from the group consisting of *S. cerevisiae, S. fragilis* and *C. utilis,* and the proteolytic enzyme is derived from *B. subtilis* or *B. licheniformis.*

The functional protein of this invention finds wide use in food compositions since it can either supplement a composition or effectively replace a substantial portion of the conventional protein content of the composition, particularly nonfat dry milk, sodium caseinate, gelatin and egg albumin.

DETAILED DESCRIPTION OF THE INVENTION

The instant process provides a simple and inexpensive means of separating the protein of many natural protein sources from water-soluble constituents and in turn converting the separated protein into a water-soluble form with a high degree of functionality. The elaborate and costly isolation and purification techniques previously used to extract the soluble protein content of these sources are thus avoided, and a protein with improved acid solubility and heat stability is obtained in higher yields than from such techniques.

A number of methods are available to assess the functionality of a given protein intended for food use. Included are those based on solubility, emulsification, foaming, viscosity and gelation properties. The protein of the instant invention is evaluated on the basis of its suitability for use in a coffee whitener formulation. Such use not only gives an indication of the heat stability of a protein under harsh conditions but also relfects its solublity, acid stability, viscosity and emulsification characteristics. The term "functional protein" as used herein is meant to include those proteins which, when incorporated in the test formulation of Example 16 described hereinafter, produces a coffee whitener which shows no feathering (precipitation or coagulation of protein) and a fat separation no greater than that from the control formulation when added to hot coffee as described in that example. In addition, the functional protein has a bland taste with no objectional bitterness or saltiness.

Sources of the functional protein include whey, microbial protein and vegetable protein. By "whey" is meant cheese whey, the watery part of milk that is separated from the curd in the process of making cheese. The whey may be either sweet whey or acid whey and in the form of fresh whey, condensed whey or whey solids. While the present process is particularly applicable to these impure forms of whey protein, partially purified whey such as the concentrates from ultrafiltration (UF), reverse osmosis, electrodialysis or gel filtration may also be used.

The source of microbial protein may be yeast, bacteria or fungi. Preferred yeasts include those of the genera Saccharomyces, Candida, Hansenula and Pichia, especially those of the species *S. cerevisiae, S. fragilis* and *C. utilis*. Preferred genera of bacteria are Pseudomonas, Lactobacillus, Streptococcus, Micrococcus, Cellulomonas, Arthrobacter, Bacillus, Hydrogenomonas and Aerobacter, especially those of the species *P. methylotropha, L. bulgaricus* and *S. lactis*. Preferred fungi are those of the genera Trichoderma, Fusarium, Penicillium, Aspergillus, Neurospora and Endomycopsis, especially those of the species *T. viride, F. solani* and *A. oryzae*. The microbial cells are initially ruptured and the cell protein content separated from the cell debris by conventional techniques prior to processing.

Suitable vegetable protein sources include, for example, soybeans, wheat gluten, cottonseeds, okra, corn gluten, peanuts, potatoes, alfalfa, oats, rice, rapeseeds, sesame seeds and sunflower seeds. Preferred sources are soybeans, wheat gluten and cottonseeds. Especially preferred is soybeans in such forms as soy grits, solvent-extracted soybean flakes, soy flour, alcohol-treated soy flakes, soy concentrate and soy whey. The protein source is usually slurried in water, any undissolved material is separated, and the liquid phase is introduced into the process. Vegetable protein whey, like cheese whey, may be processed directly.

The introductory stream of impure protein in aqueous medium is normally a solution, but may also be a suspension provided a hazy to clear solution results from the subsequent proteolytic hydrolysis step described hereinafter. This stream is adjusted to a desired pH, heated to a temperature of from about 40° to 150° C and held at that temperature until substantial precipitation of denatured protein occurs. By "substantial" is meant at least 50 percent of the ultimate protein precipitation possible at the temperature and pH employed. The protein content of the crude protein is normally about 1 to 60 weight percent on a dry basis while the level of the crude protein in the introductory stream is conveniently from about 1 to 25 weight percent. While the pH during this step is not critical, the precipitation is customarily conducted at a pH of from about 0.5 to 9. Much above pH 9 or below pH 0.5, excessive degradation of the protein may occur. Preferably the precipitation is conducted at about the isoelectric pH of the protein to maximize its recovery. This pH varies with the protein source and is normally from about 4 to 7. The indicated temperature normally results in substantial precipitation in 1 second to 60 minutes. At temperatures much below 40° C, the rate of precipitation is too slow to be practical. At temperatures much above 150° C, the protein may develop off flavor. Preferably the temperature is between about 70° and 95° C, where substantial precipitation occurs in from about two seconds to 10 minutes.

The precipitated heat-denatured protein is separated from the aqueous medium by any convenient method such as filtration or centrifugation, the latter being preferred. The separated precipitate is preferably washed with water to minimize the watersoluble impurities in the precipitate. These impurities include, for example, lactose and salt in the case of whey protein and ribonucleic acid in the case of microbial protein. The separated precipitate may also be washed with a water-soluble food grade alcohol such as ethanol prior to the water wash, if desired. The wet heat-denatured protein solids can be dried by conventional means, if desired, or may be used directly in the next step of the process.

The heat-denatured protein is slurried in aqueous medium and converted to functional protein with proteolytic enzyme. Any acid, neutral or alkaline protease of microbial, plant or animal origin is suitable. Preferred are microbial proteases of bacterial origin such as those derived from *B. subtilis* and *B. licheniformis* and those of fungal origin such as those derived from *A. oryzae, A. flavus, A. niger* and *S. griseus*; plant proteases such as papain, ficin and bromelain; and animal proteases such as pepsin, trypsin, chymotrysin and rennin. Particularly suitable are those proteases derived from *B. licheniformis* and *B. subtilis*. Combinations of such proteases or proteases with peptidases may also be used. The sole requirement is that the protease be present in sufficient amount to insure conversion of the denatured protein to functional protein within 30 minutes without creating objectionable bitterness in the final protein product.

While the minimum level of proteolytic activity is critical to the success of the instant invention, the maximum level is determined solely by economics. Thus a practical operating range for the proteolytic enzyme level, expressed in units of proteolytic enzyme per gram of dry denatured protein, would be:

240 to 1200 HUT for microbial acid protease;
300 to 1500 PC for microbial neutral protease;
2300 to 24,000 Delf Units for microbial alkaline protease;
130,000 to 1,200,000 N.F. PU for plant protease and
150 to 750 Pepsin Units for animal protease.

The units used herein to express the activity of the above classes or proteases are well known to the art and are clearly defined in such references as the First Supplement to the Food Chemical Codex, second Edition, 1974.

The concentration of the denatured protein in the aqueous slurry is not critical and is normally from about 1 to 20 weight percent on a dry basis. The temperature and the pH of the hydrolysis will depend upon the nature of the protein hydrolyzed and the proteolytic enzyme employed, and are selected to optimize the conversion of the denatured protein to functional protein. Convenient temperatures range from about 20° to 65° C. Much below 20° C, the hydrolysis proceeds at a rather slow rate, while at temperatures much above 65° C, the enzyme may be deactivated. The optimum temperature is normally about 50° C.

At the completion of the reaction, the resulting hazy to clear functional protein solution is treated for enzyme deactivation. The method of treatment will depend upon the nature of the enzyme, but the deactivation is usually accomplished by heating the reaction solution to from about 80° to 100° C for from about 1 to 20 minutes. Depending upon the enzyme employed, such treatment may be accompanied by pH adjustment.

The functional protein solution following enzyme deactivation is normally cooled to about room temperature, adjusted to pH 6 to 8 and then either used directly in food compositions or dried by conventional means such as spray or freeze drying prior to such use. By "food composition" is meant a composition ingested by animals including humans to satisfy hunger or thirst. Suitable food compositions are those which comprise the functional protein of the process of the instant invention and at least one member selected from the group consisting of carbohydrate, fat, a second souce of protein other than the functional protein, vitamins and minerals.

Functional proteins prepared by the process of the instant invention are useful in such a broad range of food compositions because of their lack of bitterness and their excellent functionality, including solubility over a wide pH range, heat stability, low viscosity in solution, and excellent dispersability, aerating, emulsifying and texturizing properties. While these proteins are suitable as nutritional supplements, where they may be the sole source of protein in a food composition, their principal use is as a replacement for a substantial portion (at least 20 percent by weight) of many of the more costly soluble proteins traditionally used in foods, particularly nonfat dry milk, sodium caseinate, egg albumin and gelatin. In many cases, as shown in the examples, such replacement results in a superior food product.

Thus, we find the functional protein, because of its acid solubility, readily suitable for use in acid food compositions such as carbonated and acidic noncarbonated beverages where traditional proteins cannot be used. The functional protein can replace up to twice its weight of nonfat dry milk in many food compositions including baked goods such as yeast-leavened bread, confections such as frostings and milk nougat, desserts such as puddings and ice cream, instant breakfast foods, processed meats such as meatloaf, dressings such as salad dressing and mayonnaise, and fermented milk products such as yogurt. Sodium caseinate is totally replaced in such food compositions as coffee whiteners, nondairy products such as cream cheese, nondairy processed cheese and nondairy cheese spreads, whipped toppings and sour cream as well as in both milk and citrus type instant breakfasts and in processed meat products. Gelatin may be wholly replaced in such food compositions as instant frozen pudding and bakers marshmallow, while egg albumin is partially to totally replaced in such products as meringues, confections such as soft-centered candies, angel food cake, textured vegetable protein, pasta and noodles. The functional protein can also replace combinations of natural proteins, for example, nonfat dry milk and egg albumin in chemically leavened baked goods such as cakes; nonfat dry milk and egg yolks in salad dressings; nonfat dry milk, egg solids and soy protein in snack foods such as batter-coated onion rings; egg albumin and soy protein in high protein breakfast foods; gelatin and Hyfoama[1] in bakers marshmallow; and gelatin and soy protein in lemon chiffon.

(1) registered trademark for proteinaceous whipping agent supplied by Lenderink & Co., New York, New York The following examples merely illustrate the process of the present invention and the use of the functional protein product of the invention in food compositions, and are not to be construed as limiting the invention, the scope of which is defined by the appended claims.

EXAMPLE 1

A sample of fresh sweet cheese whey (94.6 liters) was adjusted to pH 5.0, heated to 90° C and held at that temperature for five minutes. The resulting slurry was cooled to room temperature and centrifuged. The centrifuge cake was washed with water to yield 1415 g of wet heat-denatured whey protein solids (436 g dry).

A portion (32.7 g) of the wet heat-denatured whey protein solids (10.1 g dry) was dispersed in 100 ml water. The slurry was adjusted to pH 8.5 and 50° C, 20 mg of Alcalase[1] S-6 (2970 Delf Units/g protein) was added, and the mixture was stirred at 50° C and pH 8.5 for 30 minutes, the pH being maintained by the addition of 1 N NaOH. The resulting solution was heated to 80° C for two minutes to deactivate the added enzyme. The solution was then cooled to room temperature, adjusted to pH 7.0 with 1 N HCl and freeze dried. The dry product passed the protein functionality test and had acceptable taste with no objectionable bitterness or saltiness.

(1) registered trademark for microbial alkaline protease derived from *B. licheniformis* supplied by Novo Enzyme Corp., Mamaroneck, N.Y.

The fresh whey may also be adjusted to pH 4.0 and 40° C, or to pH 7.0 and 150° C, pH 0.5 and 100° C or pH 9.0 and 120° C, and held for an appropriate time to substantially precipitate the whey protein solids.

Proteolysis of the heat-denatured whey protein solids may also be run at 20° C or at 65° C, using 2300 Delf Units or more of Alcalase S-6 per gram of dry protein to insure solution of the protein within 30 minutes.

EXAMPLE 2

A sample of UF whey concentrate (600 g; 40 weight percent solids)[1] was diluted to 2400 g with water, adjusted to pH 4.8, heated to 90° C and held at that temperature for two minutes. The resulting slurry was cooled to room temperature and centrifuged. The centrifuge cake was washed with water and freeze dried to yield 112.5 g heat-denatured whey protein solids.

(1) Crowley Cheese Company, Binghamton, N.Y.

A portion (10 g) of the heat-denatured whey protein solids was dispersed in 90 ml water. The slurry was adjusted to pH 9.5 and 50° C, 25 mg Alcalase S-6 (3750 Delf Units/g protein) was added, and the mixture was stirred at 50° C for 15 minutes, the pH being maintained by the addition of 1 N NaOH. The resulting solution was heated to 80° C for two minutes to deactivate the added enzyme and the solution was then cooled to room temperature, adjusted to pH 7.0 with 1 N HCl and freeze dried. The dry product passed the protein functionality test and had acceptable taste with no objectionable bitterness or saltiness.

Use of 7.5 mg Alcalase S-6 (11,250 Delf units)/g protein in the above enzyme treatment likewise resulted in a functional protein with acceptable tase. A comparable product was also obtained when the above process was followed with the exception that the centrifuge cake from the heat precipitation step was washed initially with ethanol and then with water, and the enzyme treatment was with 5.0 mg (7500 Delf Units)/g protein.

EXAMPLE 3

The enzyme treatment of Example 2 was repeated on a second 10 g portion of the same heat-denatured whey protein solids but with 15 mg Alcalase S-6 (2250 Delf Units/g protein), running the treatment until the takeup of 1 N NaOH was equal to that when 25 mg Alcalase S-6 was used. This required 36 minutes. The dry product did not pass the protein functionality test and had inferior taste with slightly objectionable bitterness.

EXAMPLES 4-7

The enzyme treatment of Example 2 was repeated on heat-denatured whey protein solids, prepared from UF whey concentrate as in that example, but with the following variations in the treatment:

| Example | 4 | 5 | 6 | 7 |
|---|---|---|---|---|
| Protein slurry | | | | |
| Protein, g | 10 | 25 | 25 | 25 |
| Water, ml | 90 | 225 | 225 | 225 |
| Enzyme treatment | | | | |
| Enzyme Nature | Subtilisin[1] | papain[2] | pepsin[3] | fungal protease[4] |
| Amount, mg | 50 | 250 | 250 | 250 |
| Units/g protein[5] | 7500 | 162,000 | 200 | 310 |
| Temp. °C | 50 | 50 | 37 | 50 |
| pH | 8.5 | 8.5 | 2.5 | 7.0 |
| Time, min | 5 | 30 | 30 | 30 |
| Deactivation Temp. °C | 80 | 80 | 95 | 80 |
| Time, min | 2 | 10 | 10 | 2 |

[1] microbial alkaline protease derived from *B. subtilis* supplied by Sigma Chemical Co., St. Louis, Missouri
[2] plant protease supplied by Wallerstein Co., Division Travenol Labs, Inc., Morton Grove, Illinois
[3] animal protease supplied by Worthington Biochemical Corp., Freehold, New Jersey
[4] microbial neutral protease derived from *A. oryzae* supplied by Wallerstein Co.
[5] Example 4 - Delf Units; Example 5 - N.F. PU; Example 6 - Pepsin Units; Example 7 - PC The resulting freeze dried product from each of the runs passed the protein functionality test and had good taste with no objectional bitterness or saltiness.

EXAMPLE 8

*S. cerevisiae* yeast cells (800 g wet, 172 g dry) were dispersed in 1000 ml water and the pH of the slurry was adjusted to 9.5 by the addition of 1 N NaOH. The cells were homogenized at 9000 psi (633 kg/cm$^2$) and 30° C for 80 minutes. The resulting mixture was centrifuged and the supernatant liquor decanted. The residual solids were repulped in 1000 ml water and recentrifuged. The supernatant liquors were combined, adjusted to pH 6.0, heated to 70° C and held at that temperature for 1 minute. The resulting slurry was centrifuged and the centrifuge cake was washed with water to yield 392 g wet heat-denatured yeast protein solids (72 g dry).

A portion (50 g) of the wet heat-denatured yeast protein solids (9.2 g dry) was dispersed in 200 ml water. The slurry was adjusted to pH 8.5 and 50° C, 100 mg subtilsin (16,300 Delf Units/g protein) was added and the mixture was stirred at 50° C and pH 8.5 for 30 minutes, the pH being maintained by the addition of 1 N NaOH. The resulting solution was heated to 80° C for 5 minutes to deactivate the added enzyme, and the solution was then cooled to room temperature, adjusted to pH 7.0 with 1 N HCl and freeze dried. The product passed the protein functionality test and had acceptable taste with no objectional bitterness or saltiness.

The hydrolysis may be repeated using fungal protease[1] at a level of 240 HUT/g protein at 50° C and pH 5.0 for 30 minutes to yield a functional protein with acceptable taste.
[1] microbial acid protease supplied by Miles Laboratories, Inc., Elkhart, Ind.

Substitution of *S. fragilis* or *C. utilis* yield cells, *P. methylotropha*, *L. bulgaricus* or *S. lactis* bacterial cells, or *T. viride*, *F. solani* or *A. oryzae* fungal cells for *S. cerevisiae* cells in this preparation will also result in a functional protein with acceptable taste.

EXAMPLE 9

A sample of 200 g of dry heat-denatured *S. cerevisiae* yeast protein solids[1] was slurried in 1000 ml ethanol, filtered and washed with water. The washed filter cake was slurried in 1000 ml water, the slurry was adjusted to pH 8.5 and 50° C, 2.0 g of Alcalase S-6 (15,000 Delf units/g protein) was added and the mixture was stirred at 50° C and pH 8.5 for 30 minutes. The resulting solution was heated to 80° C for 3 minutes to deactivate to added enzyme, and the solution was then cooled to room temperature, adjusted to pH 7.0 with 1 N HCl and freeze dried. The product passed the protein functionality test and had acceptable taste with no objectionable bitterness or saltiness.
[1] Baker's yeast protein, supplied by Anheuser-Busch, Inc., St. Louis, Mo., precipitated at 50° C, pH 6.0 from mechanically ruptured cells

EXAMPLE 10

A mixture of 100 g of solvent-extracted soybean flakes[1] and 1400 ml water was stirred for 2 hours at 140° F (60° C) and then filtered over screens. The residual flakes were reslurried in 1100 ml water for 10 minutes at 85° F (29° C) and refiltered over the screens. The combined liquors were clarified by filtration, adjusted to pH 5.0, heated to 95° C and held at that temperature for 10 minutes. The resulting slurry was cooled to room temperature and centrifuged, and the centrifuge cake was washed with water to yield 100 g of wet heat-denatured soy protein solids (25 g dry).

The wet heat-denatured soy protein solids was slurried in 300 ml water. The slurry was adjusted to pH 9.5 and 50° C, 125 mg of Alcalase S-6 (7500 Delf Units/g protein) was added and the mixture was stirred at 50° C and pH 9.5 for 15 minutes, the pH being maintained by the addition of 1 N NaOH. The resulting solution was heated to 85° C for 2 minutes to deactivate the added enzyme and the solution was then cooled to room temperature, adjusted to pH 7.0 and freeze dried. The dry product passed the protein functionality test and had acceptable taste with no objectionable bitterness or saltiness.
[1] Central Soya Inc., Chicago, Ill.

The solvent-extracted soybean flakes may be replaced by soy flour, alcohol-treated soy flakes, soy concentrate or soy grits.

EXAMPLE 11

A 50 g sample of dry soy whey solids[1] was dissolved in 150 ml water. The solution was adjusted to pH 5.0, heated to 95° C and held at that temperature for 5 minutes. The resulting slurry was cooled to room temperature and centrifuged, and the centrifuge cake was washed with water to yield 32 g of wet heat-denatured soy whey protein solids (8 g dry). The wet cake was reslurried in 75 ml water. The slurry was adjusted to pH 9.0 and 50° C, 50 mg of Alcalase S-6 (9375 Delf Units/g protein) was added, and the mixture was stirred at 50° C and pH 9.0 for 15 minutes, the pH being maintained by the addition of 1N NaOH. The resulting solution was heated to 80° C for 3 minutes to deactivate the added enzyme, and the solution was then cooled to room temperature, adjusted to pH 7.0 and freeze dried. The dry product passed the protein functionality test and had acceptable test with no objectional bitterness or saltiness.

(1) Central Soya Inc.

EXAMPLE 12

Functional and heat-denatured whey protein solids, prepared as in Example 2, were tested for their effectiveness in replacing the nonfat dry milk (NFDM) content of yeast-leavened baked goods using the following formulations for a standard white bread:

| Ingredient, grams | Control | Test |
|---|---|---|
| Flour, all purpose | 250.0 | 250.0 |
| Dry yeast | 6.25 | 6.25 |
| Granulated sugar | 20.00 | 20.00 |
| Nonfat dry milk (NFDM) | 5.00 | — |
| Functional or denatured whey protein | — | 2.50 |
| Salt | 5.75 | 5.75 |
| Calcium phosphate (monobasic) | 0.50 | 0.50 |
| Vegetable shortening | 8.25 | 8.25 |
| Azodicarbamide (0.1% solution) | 2.83 | 2.83 |
| Potassium bromate (0.45% solution) | 2.50 | 2.50 |
| Water | 165.0 | 165.0 |
| Stearyl-2-lactylate emulsifier | 0.50 | 0.50 |
| Lactose | — | 2.50 |

The ingredients of each formulation were blended and the resulting dough was transferred to greased pans, allowed to rise for 5 hours at 60° C and baked at 430° F (221° C).

Test formulations in which the protein replacement was either functional whey protein solids or 1:1 functional whey protein solids:heat-denatured whey protein solids resulted in good quality bread with superior taste, texture and loaf volume. Replacement with heat-denatured whey protein solids alone gave a bread with taste comparable to the control but with poorer texture and lower loaf volume.

Functional yeast protein solids, prepared as in Example 8, may be substituted for functional whey protein solids in this recipe.

EXAMPLE 13

Functional and heat-denatured whey protein solids, prepared as in Example 2, were tested for their effectiveness in replacing the NFDM content of salad dressings using the following formulations:

| Ingredient, grams | Control | Test |
|---|---|---|
| Vinegar | 20.0 | 20.0 |
| Blue cheese | 12.0 | 12.0 |
| NFDM | 5.0 | — |
| Functional or denatured whey protein | — | 2.5 |
| Instant starch | 3.0 | 3.0 |
| Egg yolk | 1.0 | 1.0 |
| Granulated sugar | 4.0 | 4.0 |
| Salt | 4.0 | 4.0 |
| Vegetable oil | 15.0 | 15.0 |
| Dry mustard | 0.4 | 0.4 |
| Onion powder | 0.2 | 0.2 |
| Garlic powder | 0.2 | 0.2 |
| Monosodium glutamate | 0.1 | 0.1 |
| Water | 35.1 | 35.1 |

The starch of each formulation was combined with the water and vinegar in a blender operating at medium speed. The remaining dry ingredients, previously blended, were added, followed by the egg yolk, vegetable oil and finally the blue cheese. The mixture was blended to a smooth consistency and refrigerated.

The test formulation in which the protein replacement was functional whey protein solids resulted in a good quality salad dressing with improved taste, viscosity and resistance to water separation. The replacement with heat-denatured whey protein gave a dressing with poorer taste and reduced viscosity which also showed water separation.

Preparation of a dressing as indicated in which 3.5 g of functional whey protein solids replaced both the 5.0 g of NFDM and 1.0 of egg yolk in the control formulation resulted in a product of improved viscosity and enhanced flavor with no indication of water separation.

EXAMPLE 14

Functional and heat-denatured whey protein solids, prepared as in Example 2, were tested for their effectiveness in replacing the NFDM content of confections using the following formulations for a chocolate frosting:

| Ingredient, grams | Control | Test |
|---|---|---|
| Vegetable shortening | 26.6 | 26.6 |
| Granulated sugar | 60.1 | 60.1 |
| Tapioca starch | 0.5 | 0.5 |
| NFDM | 3.8 | — |
| Functional or denatured whey protein | — | 1.9 |
| Cocoa | 5.8 | 5.8 |
| Vanillin | 0.1 | 0.1 |
| Salt | 0.08 | 0.08 |
| Chocolate coloring | 0.04 | 0.05 |
| Water (boiling) | 56.9 | 56.9 |

The boiling water was added to the preblended dry ingredients and the mixture was whipped (15–20 minutes) until the desired overrun was obtained. The resulting frosting was stored under refrigeration.

The test formulation in which the protein replacement was functional whey protein solids resulted in a good quality chocolate frosting with improved taste. The replacement with heat-denatured whey protein also gave a good quality frosting but with poorer taste.

A blend of functional whey protein solids with gelatin was prepared in which 2.1 g of gelatin was dissolved in 200 ml of water at 50° C and the solution was combined with 43.7 g of the functional whey protein solids, 3.4 g sodium hexametaphosphate and 1.7 g potassium aluminum sulfate, adjusted to pH 5.0 and freeze dried. Use of this blend as the protein replacement in the test formulation resulted in a superior chocolate frosting with highly improved taste, spreadability, gloss dryness and peak characteristics.

Functional yeast protein solids, prepared as in Example 8, may be substituted for functional whey protein solids in this recipe.

EXAMPLE 15

Functional and heat-denatured whey protein solids, prepared as in Example 2, were tested for their effectiveness in replacing the NFDM content of frozen desserts using the following formulations for chocolate ice cream:

| Ingredient, grams | Control | Test |
|---|---|---|
| Heavy cream | 25.0 | 25.0 |
| NFDM | 9.95 | — |
| Functional or denatured whey protein | — | 4.97 |
| Granulated sugar | 18.0 | 18.0 |
| Lactose | — | 4.98 |
| Gelatin | 0.5 | 0.5 |
| Cocoa powder | 3.0 | 3.0 |
| Water | 43.05 | 43.05 |
| Vanilla extract | 0.5 | 0.5 |

The gelatin was dissolved in a small portion of the water at 145°–150° F (63°–66° C) and added with constant stirring to the previously blended remaining ingredients, except flavoring, at that temperature. The resulting mixture was pasteurized for 20–30 minutes at 165° F (74° C) and the flavoring added. The mixture was then homogenized through a 2-stage homogenizer, rapidly cooled to 40° F (4° C) and frozen by standard ice cream freezing techniques.

The test formulation in which the protein replacement was functional whey protein solids resulted in a good quality ice cream with superior overrun, taste, texture and mouthfeel. The replacement with heat-denatured whey protein solids gave an ice cream with inferior overrun, taste, texture and mouthfeel.

Functional yeast protein solids, prepared as in Example 8, may be substituted for functional whey protein solids in this recipe.

EXAMPLE 16

Functional and heat-denatured whey protein solids, prepared as in Example 2, were tested for their effectiveness in replacing sodium caseinate in nondairy coffee whiteners using the following formulations:

| Ingredient, grams | Control | Test |
|---|---|---|
| Vegetable shortening | 20.0 | 20.0 |
| Corn syrup solids 42 D.E. | 20.0 | 20.0 |
| Sodium caseinate | 6.0 | — |
| Functional or denatured whey protein | — | 6.0 |
| Carrageenan | 0.4 | 0.4 |
| Span[1] 60 | 0.5 | 0.5 |
| Polysorbate 60 | 0.3 | 0.3 |
| Potassium dihydrogen phosphate | 0.4 | 0.4 |
| Water | 152.0 | 152.0 |

[1] registered trademark for emulsifier supplied by ICI United States, Inc., Wilmington, Delaware The water and shortening were heated to 140° F (60° C) and the sodium caseinate or its protein replacement followed by the previously melted emulsifiers, the carrageenan and the corn syrup solids were added with mixing. The mixture was then heated to 160° F (71° C), homogenized hot through a 2-stage homogenizer, adjusted to pH 7.0 if necessary, cooled and stored at 40° F (4° C).

Each resulting liquid coffee whitener was evaluated by adding 10 ml of the whitener to 80 ml of a solution of 2 weight percent freeze dried coffee in water at 165° F (74° C) and then heating the resulting mixture to 195° F (91° C).

The test formulation in which the protein replacement was functional whey protein performed similarly to the control in that both the control and test coffees were free of feathering (protein coagulation or precipitation) and showed only slight oil separation during the heating from 165° to 195° F. By contrast, the coffee utilizing heat-denatured whey protein solids in the test formulation showed considerable feathering and oil separation during the heating.

Functional yeast and bacteria protein solids, prepared as in Examples 8 and 9, and functional soy protein solids, prepared as in Examples 10 and 11, replaced the functional whey protein solids in this formulation with comparable results.

EXAMPLE 17

Functional and heat-denatured whey protein solids, prepared as in Example 2, were tested for their effectiveness in replacing the NFDM content of an instant breakfast food using the following formulations:

| Ingredient, grams | Chocolate Control | Chocolate Test | Orange Control | Orange Test |
|---|---|---|---|---|
| NFDM | 9.0 | — | 10.6 | — |
| Functional or denatured whey protein | — | 4.5 | — | 5.3 |
| Lactose | — | 4.5 | — | 5.3 |
| Granulated sugar | 6.0 | 6.0 | 6.0 | 6.0 |
| Corn syrup solids | 2.0 | 2.0 | 2.0 | 2.0 |
| Cocoa | 1.6 | 1.6 | — | — |
| Orange flavor (ml) | — | — | 0.6 | 0.6 |
| Orange color (ml)[1] | — | — | 3.0 | 3.0 |
| Salt | 0.06 | 0.06 | 0.02 | 0.02 |
| Carrageenan | 0.2 | 0.2 | 0.2 | 0.2 |
| Span 60 | 0.25 | 0.25 | — | — |
| Polysorbate 60 | 0.15 | 0.15 | — | — |
| Water | 100.0 | 100.0 | 100.0 | 100.0 |

[1] solution of 1% FDC No. 5 and 0.2% FDC No. 6

The ingredients of each formulation were combined and the resulting mixture was pasteurized at 60° C for 10 minutes, homogenized in a 2-stage homogenizer and freeze dried.

Instant breakfasts were prepared by adding 5 g of the chocolate mix solids to 100 ml of milk and the same level of the orange mix solids to orange juice.

Good quality instant breakfasts obtained with both chocolate and orange test formulations using functional whey protein solids.

Functional yeast protein solids, prepared as in Example 8, may be substituted for functional whey protein solids in these recipes.

EXAMPLE 18

Functional and heat-denatured whey protein solids, prepared as in Example 2, were tested for their effectiveness in replacing sodium caseinate in nondairy cream cheese using the following formulations:

| Ingredient, grams | Control | Test |
|---|---|---|
| Sodium caseinate | 9.5 | — |
| Functional or denatured whey protein | — | 9.5 |
| Corn syrup solids | 3.8 | 3.8 |
| Salt | 0.15 | 0.15 |
| Atmos[1] 150 | 0.40 | 0.40 |
| Agar | 2.00 | 2.00 |
| Vegetable shortening | 30.5 | 30.5 |
| Water | 54.0 | 54.0 |

[1] registered trademark for emulsifier supplied by ICI United States, Inc.

The dry ingredients were blended with the water. The melted shortening and emulsifier were added and the mixture was then adjusted to pH 4.0–5.0, pasteurized at 65° C for 15 minutes, homogenized in a single-stage homogenizer and cooled to 40° F (4° C).

The test formulation in which the protein replacement was functional whey protein solids resulted in an excellent cream cheese with superior texture and mouthfeel. Both the control formulation with sodium caseinate and the test formulation with heat-denatured whey protein solids as the protein replacement failed to give a suitable cheese because the acidic mixture curdled during pasteurization.

Repetition of the preparations substituting functional yeast protein solids and heat-denatured yeast protein solids, prepared as in Example 9, gave comparable results.

EXAMPLE 19

Functional and heat-denatured whey protein solids, prepared as in Example 2, were tested for their effectiveness in replacing the NFDM content of processed meat products using the following formulations for a meatloaf:

| Ingredient, grams | Control | Test |
|---|---|---|
| Fresh ground beef | 400 | 400 |
| Grated onions | 16.0 | 16.0 |
| Tomato catsup | 5.0 | 5.0 |
| Salt | 3.0 | 3.0 |
| NFDM | 48.0 | — |
| Functional or denatured whey protein | — | 24.0 |
| White pepper | 0.25 | 0.25 |
| Ground bay leaves | 1.0 | 1.0 |
| Worcestershire sauce | 3.0 | 3.0 |

The ingredients were mixed, transferred to a loaf pan and baked at 375° F (191° C) for 45 minutes.

The test formulation in which the protein replacement was functional whey protein solids resulted in a better textured meatloaf with enhanced flavor. Replacement with heat-denatured whey protein solids gave a poorer meatloaf with inferior taste.

Sausages and frankfurters may be prepared using appropriate recipes and similar procedures.

Functional yeast protein solids, prepared as in Example 8, may be substituted for functional whey protein solids in this recipe and in appropriate recipes for other processed meats, such as sausages and frankfurters, wherein the modified whey protein solids may replace the NFDM or sodium caseinate content of the processed meat.

EXAMPLE 20

Functional and heat-denatured whey protein solids, prepared as in Example 2, were tested for their effectiveness in replacing sodium caseinate in a whipped topping using the following formulations:

| Ingredient, grams | Control | Test |
|---|---|---|
| Vegetable shortening | 79.9 | 79.9 |
| Sodium caseinate | 1.0 | — |
| Functional or denatured whey protein | — | 1.0 |
| Carrageenan | 1.41 | 1.41 |
| Guar gum | 0.94 | 0.94 |
| Polysorbate 60 | 2.11 | 2.11 |
| Span 60 | 0.84 | 0.84 |
| Granulated sugar | 70.0 | 70.0 |
| Vanilla flavor | 2.5 | 2.5 |
| Water | 146.0 | 146.0 |

The water and vegetable shortening were combined, heated to 160° F (71° C) and mixed with the sodium caseinate or its replacement. The combined carrageenan, guar gum, Polysorbate 60 and Span 60 were heated to 120° F (49° C) and added to the mixture. The sugar and flavor were then added and the resulting mixture was homogenized hot through a 2-stage homogenizer, cooled to 50° F (10° C) and stored at 40° F (4° C) for 4 hours. The chilled mixture was whipped to 150-250 percent overrun using a high-speed mixer with nitrogen injection, and the whipped product was packaged and frozen.

The test formulation in which the protein replacement was functional whey protein solids gave excellent whipped topping with improved overrun, while that in which the replacement was heat-denatured whey protein solids failed to whip, having an overrun of less than 50 percent.

The topping preparation was repeated using functional yeast protein solids and heat-denatured yeast protein solids, prepared as in Example 8. The overrun was even higher with the functional protein while the formulation with the denatured protein again failed to whip.

EXAMPLE 21

Functional and heat-denatured whey protein solids, prepared as in Example 2, were tested for their effectiveness in replacing gelatin in instant frozen milk desserts using the following formulations:

| Ingredient, grams | Control | Test |
|---|---|---|
| Granulated sugar | 42.5 | 42.5 |
| Kaorich[1] beads | 16.5 | 16.5 |
| NFDM | 14.5 | 14.5 |
| Kaokreme[2] | 13.0 | 13.0 |
| Instant starch | 10.0 | 10.0 |
| Salt | 1.0 | 1.0 |
| Vanilla | 1.0 | 1.0 |
| Gelatin | 1.0 | — |
| Functional or denatured whey protein | — | 1.0 |
| Dextrin | — | 1.0 |
| Water (boiling) | 100.5 | 100.5 |

[1] registered trademark for vegetable shortening supplied by SCM Corporation, New York, New York
[2] trademark for vegetable shortening supplied by SCM Corporation The dry ingredients were blended in a mixer, the boiling water was added slowly in parts and with mixing to the blend, and the resulting mixture was packaged and frozen.

The test formulation in which the protein replacement was functional whey protein solids resulted in a good quality frozen dessert with improved taste. Replacement with heat-denatured whey protein solids gave a dessert of poorer taste. A test formulation in which the protein replacement was a blend of functional whey protein solids and gelatin prepared as in Example 14 gave an excellent frozen dessert with superior taste.

Functional yeast protein solids, prepared as in Example 8, may be substituted for the functional whey protein solids in this recipe.

EXAMPLE 22

Functional and heat-denatured whey protein solids, prepared as in Example 2, and functional yeast protein solids, prepared as in Example 9, were tested for their effectiveness in replacing gelatin and Hyfoama in bakers marshmallow using the following formulations:

| Ingredient, grams | Control | Test |
|---|---|---|
| Part A | | |
| Hyfoama | 3.0 | — |
| Functional or denatured protein | — | 3.0 |
| Water | 15.0 | 15.0 |
| Confectionary sugar | 15.0 | 15.0 |
| Part B | | |
| Gelatin | 1.0 | — |
| Functional or denatured protein | — | 1.0 |
| Water | 3.0 | 3.0 |
| Part C | | |
| Granulated sugar | 91.0 | 91.0 |
| Glucose | 11.0 | 11.0 |
| Water | 31.0 | 31.0 |

The ingredients of Part A were mixed and beat into a stiff foam. The gelatin or its replacement was dissolved in the water of Part B and the solution was added with mixing to Part A. The ingredients of Part C were combined, brought to a boil and blended with combined Parts A and B. The resulting mixture was beaten until the desired peaks were formed.

Test formulations in which the protein replacement was either functional whey protein solids or functional yeast protein solids resulted in good quality marshmallow of comparable taste. Replacement with heat-denatured whey protein solids gave a product that failed to whip and with highly inferior taste. A test formulation in which the protein replacement was a blend of functional whey protein solids and gelatin prepared as in Example 14 gave an excellent marshmallow with a superior taste.

EXAMPLE 23

Functional and heat-denatured whey and yeast protein solids, prepared as in Examples 2 and 9, respectively, were tested for their effectiveness in replacing egg albumin in meringues using the following formulations:

| Ingredient, grams | Control | Test |
|---|---|---|
| Egg white | 55.0 | 16.5 |
| Functional or denatured whey protein | — | 5.8 |
| Water | — | 32.7 |
| Cream or tartar | 0.8 | 0.8 |
| Granulated sugar | 77.0 | 77.0 |
| Vanilla extract (teaspoon) | ¼ | ¼ |

The egg white, or its replacement, was beaten until frothy. The cream of tartar, sugar and vanilla were added with whipping, and the whipping continued until strong peaks developed. The meringue was then spread on top of lemon filling in a precooked pie crust and the pie was baked at 400° F (204° C) for 5–10 minutes.

Test formulations in which the protein replacement was either functional whey protein solids or functional yeast protein solids resulted in good quality meringues with similar taste, improved texture and no water syneresis. Replacement with heat-denatured whey or yeast protein solids failed to produce a meringue.

EXAMPLE 24

Functional and heat-denatured yeast protein solids, prepared as in Example 9, were tested for their effectiveness in replacing egg albumin in angle food cake using the following formulations:

| Ingredient, grams | Control | Test |
|---|---|---|
| Fresh egg whites | 102 | 81.6 |
| Functional or denatured yeast protein | — | 2.75 |
| Cake flour | 30 | 30 |
| Granulated sugar | 97.0 | 97.0 |
| Salt | 0.3 | 0.3 |
| Cream of tartar | 1.75 | 1.75 |
| Vanilla extract (teaspoon) | ½ | ½ |
| Almond extract (teaspoon) | ¼ | ¼ |
| Water | — | 18.0 |

The flour and half the sugar were preblended. The egg whites, cream of tartar and salt were combined and beaten until foamy. The second half of sugar was then slowly added and the beating continued until a stiff meringue developed. The flavorings followed by the flour-sugar blend were gently folded into the meringue and the resulting batter was transferred to an ungreased tube pan and baked.

The test formulation in which the protein replacement was functional yeast protein solids resulted in a good quality angel food cake of slightly poorer taste. Replacement with the heat-denatured yeast protein solids also gave a cake of slightly poorer taste and also of lower cake volume.

EXAMPLE 25

Functional and heat-denatured whey protein solids, prepared as in Example 2, were tested for their effectiveness in replacing egg albumin in peppermint patties and other soft-centered candies using the following formulations for preparing the mazetta portion of the candy:

| Ingredient, grams | Control | Test |
|---|---|---|
| Corn syrup | 58.19 | 58.19 |
| Granulated sugar | 29.09 | 29.09 |
| Water | 10.9 | 10.9 |
| Egg albumin solids | 1.82 | — |
| Functional or denatured whey protein | — | 1.82 |

The ingredients were combined, cooked to 238° F (114° C), whipped hot to maximum overrun and cooled.

The test formulation in which the protein replacement was functional whey protein solids resulted in a good quality mazetta with improved fluff and slightly poorer taste than the control. Replacement with heat-denatured whey protein solids gave a mazetta with above the same fluff as the control but with much poorer taste.

Functional yeast protein solids, prepared as in Example 8, may be substituted for functional whey protein solids in this recipe.

EXAMPLE 26

Functional and heat-denatured whey protein solids, prepared as in Example 2, were tested for their effectiveness in replacing egg albumin as a binder for textured vegetable protein using the following formulations for textured soy protein:

| Ingredient, grams | Control | Test |
|---|---|---|
| Hydrated textured soy protein | 100 | 100 |
| Vegetable shortening | 20 | 20 |
| Egg albumin solids | 5 | — |
| Functional or denatured whey protein | — | 5 |
| Soy flour | 10 | 10 |
| Wheat gluten | 10 | 10 |
| Water | 25 | 25 |

The hydrated textured soy protein was prepared by blending 125 g textured soy protein, 300 g water, 25 g meat flavor, 8 g monosodium glutamate, 12.5 g salt and 0.5 g white pepper and allowing the blend to stand at room temperature overnight.

The vegetable shortening was melted and combined with the water, egg albumin or its replacement, soy flour and wheat gluten. This mixture was then blended with 100 g of the hydrated textured soy protein. The blend was allowed to stand 1-3 hours and was then made into meat patties and broiled at 375° F (191° C) for 15 minutes.

The test formulation in which the protein replacement was functional whey protein solids resulted in a good quality broiled patty similar to the control in binding, emulsification and sensory characteristics. Replacement with heat-denatured whey protein solids gave a poorer patty with inferior binding, emulsification and sensory characteristics.

Functional bacteria protein solids, prepared as in Example 8, may be substituted for functional whey protein solids in this recipe or in a recipe in which the protein replacement is for the soy flour or the wheat gluten content of the textured protein product.

EXAMPLE 27

The effectiveness of functional and heat-denatured whey protein solids, prepared as in Example 2, in fortifying carbonated beverages was tested by adding 0.5 to 2 g of the solids to 100 ml of a commercial carbonated orange soda or ginger ale. Addition of the functional whey protein solids did not affect the clarity or the taste of the soda. Addition of the heat-denatured whey protein solids destroyed the soda clarity with protein precipitation occurring.

Functional yeast protein solids, prepared as in Example 8, or functional soy protein solids, prepared as in Example 10 or 11, may be substituted for the functional whey protein solids in fortifying such carbonated beverages.

EXAMPLE 28

Functional and heat-denatured whey protein solids, prepared as in Example 2, were tested for their effectiveness in replacing NFDM in a chocolate milk using the following formulations:

| Ingredient, grams | Control | Test |
|---|---|---|
| NFDM | 6.6 | — |
| Functional or denatured whey protein | — | 3.3 |
| Whole milk | 25.0 | 25.0 |
| Lactose | — | 3.3 |
| Granulated sugar | 9.2 | 9.2 |
| Carrageenan | 0.04 | 0.04 |
| Cocoa | 1.02 | 1.02 |
| Vanilla | 0.15 | 0.15 |
| Water | 58.0 | 58.0 |

The ingredients were blended, pasteurized at 65° C for 10 minutes, homogenized in a 2-stage homogenizer and cooled to 40° F (4° C).

The test formulation in which the protein replacement was functional whey protein solids resulted in a good quality chocolate milk with only slightly poorer taste than that of the control. Replacement with heat-denatured whey protein solids was ineffective since the solids did not dissolve.

Functional yeast protein solids, prepared as in Example 8, may be substituted for functional whey protein solids in this formulation.

EXAMPLE 29

Functional and heat-denatured whey protein solids, prepared as in Example 2, were tested for their effectiveness in replacing NFDM, egg solids and soy protein in snack foods using the following formulations for batter-coated onion rings:

| Ingredient, grams | Control | Test |
|---|---|---|
| NFDM | 8.0 | — |
| Functional or denatured whey protein | — | 7.2 |
| Soy protein | 2.2 | — |
| Wheat flour | 32.6 | 32.6 |
| Salt | 0.78 | 0.78 |
| Egg solids | 0.30 | 0.15 |
| Vegetable shortening | 2.33 | 2.33 |
| 1:1 Atmos 300:Tween[1] 60 | 0.30 | 0.30 |
| Water | 54.0 | 54.0 |

[1]registered trademark for emulsifier supplied by ICI United States, Inc.

All ingredients except the emulsifiers and shortening were thoroughly blended. The emulsifiers and shortening were combined, melted and added to the blend. Sliced onion rings were dipped in the resulting batter and fried in vegetable oil at 325° F (163° C).

The test formulation in which the protein replacement was functional whey protein solids resulted in improved quality onion rings which were crisp and had a light fat taste and good flavor. Replacement with heat-denatured whey protein solids gave rings of about the same quality as the control.

Functional yeast protein solids, prepared as in Example 8, may be substituted for functional whey protein solids in this recipe.

What is claimed is:

1. A process for the preparation of functional protein, which comprises:
   (a) subjecting impure natural protein selected from the group consisting of whey, microbial protein and vegetable protein to a temperature of from about 40° to 150° C in aqueous medium until at least 50% of the ultimate protein capable of precipitation occurs;
   (b) separating said precipitated protein from said medium;
   (c) treating said separated protein in aqueous medium with a proteolytic enzyme at a temperature of from about 20° to 65° C for a period of up to 30 minutes until solution occurs; and
   (d) deactivating said enzyme, said enzyme being employed at a level, per gram of said separated protein on a dry basis, of at least about
   240 HUT where said enzyme is a microbial acid protease,
   300 PC where said enzyme is a microbial neutral protease,
   2300 Delf Units where said enzyme is a microbial alkaline protease,
   130,000 N.F. PU where said enzyme is a plant protease, and
   150 Pepsin Units where said enzyme is an animal protease, said impure protein being such that in in an aqueous medium a solution or suspension is formed and said suspension must be such that a hazy or clear solution results from said proteolytic hydrolysis.

2. The process of claim 1 wherein said functional protein is derived from whey.

3. The process of claim 1 wherein the source of said microbial protein is a yeast selected from the group consisting of S. cerevisiae, S. fragilis and C. utilis.

4. The process of claim 1 wherein in step (a) said temperature is about 70° to 95° C and the pH of said aqueous medium is about 4 to 7.

5. The process of claim 1 wherein said proteolytic enzyme is derived from B. subtilis or B. licheniformis.

6. A functional protein prepared by the process of claim 1.

7. The functional protein of claim 6 wherein said protein is derived from whey.

8. A food composition comprising a functional protein prepared by the process of claim 1 and at least one member selected from the group consisting of carbohydrate, fat, a second source of protein other than said functional protein, vitamins and minerals.

9. The food composition of claim 8 wherein said functional protein is the sole source of protein in said food composition.

10. The food composition of claim 8 containing said second source of protein, the functional protein constituting at least 20% by weight of the total protein content of said food composition.

11. The food composition of claim 10 wherein said second source of protein is nonfat dry milk, sodium caseinate, gelatin or egg albumin.

* * * * *